United States Patent
Atsumi (10) Patent No.: US 10,703,414 B2
(45) Date of Patent: Jul. 7, 2020

(54) VEHICLE FRONT PORTION STRUCTURE

(71) Applicant: TOYOTA JIDOSHA KABUSHIKI KAISHA, Aichi-ken (JP)

(72) Inventor: Hyuga Atsumi, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/951,400

(22) Filed: Apr. 12, 2018

(65) Prior Publication Data
US 2018/0327031 A1    Nov. 15, 2018

(30) Foreign Application Priority Data

Apr. 28, 2017  (JP) .................................. 2017-090786

(51) Int. Cl.
| | | |
|---|---|---|
| *B62D 21/03* | (2006.01) | |
| *B62D 21/15* | (2006.01) | |
| *B62D 25/08* | (2006.01) | |
| *B62D 21/11* | (2006.01) | |
| *B62D 21/05* | (2006.01) | |
| *B62D 21/07* | (2006.01) | |

(52) U.S. Cl.
CPC ............ *B62D 21/152* (2013.01); *B62D 21/03* (2013.01); *B62D 21/05* (2013.01); *B62D 21/07* (2013.01); *B62D 21/11* (2013.01); *B62D 25/08* (2013.01); *B62D 21/155* (2013.01)

(58) Field of Classification Search
CPC ........ B62D 21/02; B62D 21/03; B62D 21/11; B62D 21/152; B62D 21/155

USPC .............. 296/203.01, 203.02, 187.09, 187.1, 296/193.09, 204
See application file for complete search history.

(56) References Cited

U.S. PATENT DOCUMENTS

| | | | | |
|---|---|---|---|---|
| 5,611,568 | A * | 3/1997 | Masuda | B60R 21/0136 280/784 |
| 8,720,981 | B1 * | 5/2014 | Shafer | B62D 25/025 296/187.08 |
| 9,067,627 | B2 * | 6/2015 | Hara | B62D 21/152 |
| 2004/0195862 | A1 * | 10/2004 | Saeki | B62D 21/152 296/187.09 |
| 2006/0113784 | A1 * | 6/2006 | Kishima | B62D 21/155 280/784 |
| 2010/0072787 | A1 * | 3/2010 | Abe | B62D 21/11 296/203.04 |

(Continued)

FOREIGN PATENT DOCUMENTS

| | | |
|---|---|---|
| CN | 1732105 A | 2/2006 |
| CN | 103183053 A | 7/2013 |

(Continued)

*Primary Examiner* — Dennis H Pedder
(74) *Attorney, Agent, or Firm* — Hauptman Ham, LLP (57) ABSTRACT

A vehicle front portion structure that includes: a first lateral connecting member that is disposed between a pair of left and right front side members, and that connects the pair of left and right front side members parallel to a vehicle transverse direction, wherein vehicle longitudinal direction positions of portions, to which the first lateral connecting member is joined, at the pair of left and right front side members coincide with vehicle longitudinal direction positions of portions, to which front side joining portions of a suspension member are joined, at the pair of left and right front side members.

10 Claims, 7 Drawing Sheets

(56) References Cited

U.S. PATENT DOCUMENTS

2012/0187724 A1 7/2012 Tomozawa et al.
2014/0062129 A1* 3/2014 Syed .................... B60R 19/24
                                                296/187.1
2014/0339856 A1 11/2014 Obata et al.

FOREIGN PATENT DOCUMENTS

WO   2006/032973 A1   3/2006
WO   2009/001655 A1   12/2008

\* cited by examiner

VEHICLE FRONT PORTION STRUCTURE

CROSS-REFERENCE TO RELATED APPLICATION

This application is based on and claims priority under 35 USC 119 from Japanese Patent Application No. 2017-090786 filed on Apr. 28, 2017, which is incorporated by reference herein.

BACKGROUND

Technical Field

The present disclosure relates to a vehicle front portion structure.

Related Art

Chinese Patent Application Publication No. 103183053 discloses a vehicle front portion structure of an electric automobile. This vehicle front portion structure has a sub-frame in addition to main parts such as left and right front side members and a bumper RF and the like. Various types of modules such as a motor controller, a high-voltage converter, a low-voltage converter, a charger and the like are installed on the sub-frame.

However, in the above-described related art, there is room for improvement with regard to the safety performance at the time of a head-on collision.

SUMMARY

An object of the present disclosure is to provide a vehicle front portion structure that efficiently utilizes the frame structure at the side opposite the collision at the time of an offset collision or the like, and that can keep uncrushed portions that arise at front side members to a minimum, and that has excellent collision safety performance.

A vehicle front portion structure of an aspect includes: a pair of left and right front side members that are disposed at a vehicle front portion and that extend along a vehicle longitudinal direction; a suspension member that is disposed at a vehicle lower side of the pair of left and right front side members, and that is joined to the pair of left and right front side members at a pair of left and right front side joining portions and at a pair of left and right rear side joining portions; and a first lateral connecting member that is disposed between the pair of left and right front side members, and that connects the pair of left and right front side members parallel to a vehicle transverse direction, wherein vehicle longitudinal direction positions of portions, to which the first lateral connecting member is joined, at the pair of left and right front side members coincide with vehicle longitudinal direction positions of portions, to which the front side joining portions of the suspension member are joined, at the pair of left and right front side members.

BRIEF DESCRIPTION OF THE DRAWINGS

FIG. 2 is a schematic side view in which FIG. 1 is seen from a vehicle side.

DESCRIPTION OF EMBODIMENTS

First Embodiment

A vehicle front portion structure S1 relating to a first embodiment of the present disclosure is described hereinafter by using FIG. 1 through FIG. 3.

Note that arrow FR that is shown appropriately in the respective drawings indicates the vehicle front side, arrow UP indicates the vehicle upper side, and arrow LH indicates the vehicle transverse direction left side. Further, in the following description, when longitudinal, vertical and left-right directions are used, they refer to the longitudinal of the vehicle longitudinal direction, the vertical of the vehicle vertical direction and the left and right of the vehicle transverse direction, unless otherwise specified.

(Front Side Members 20)

Figure 1:
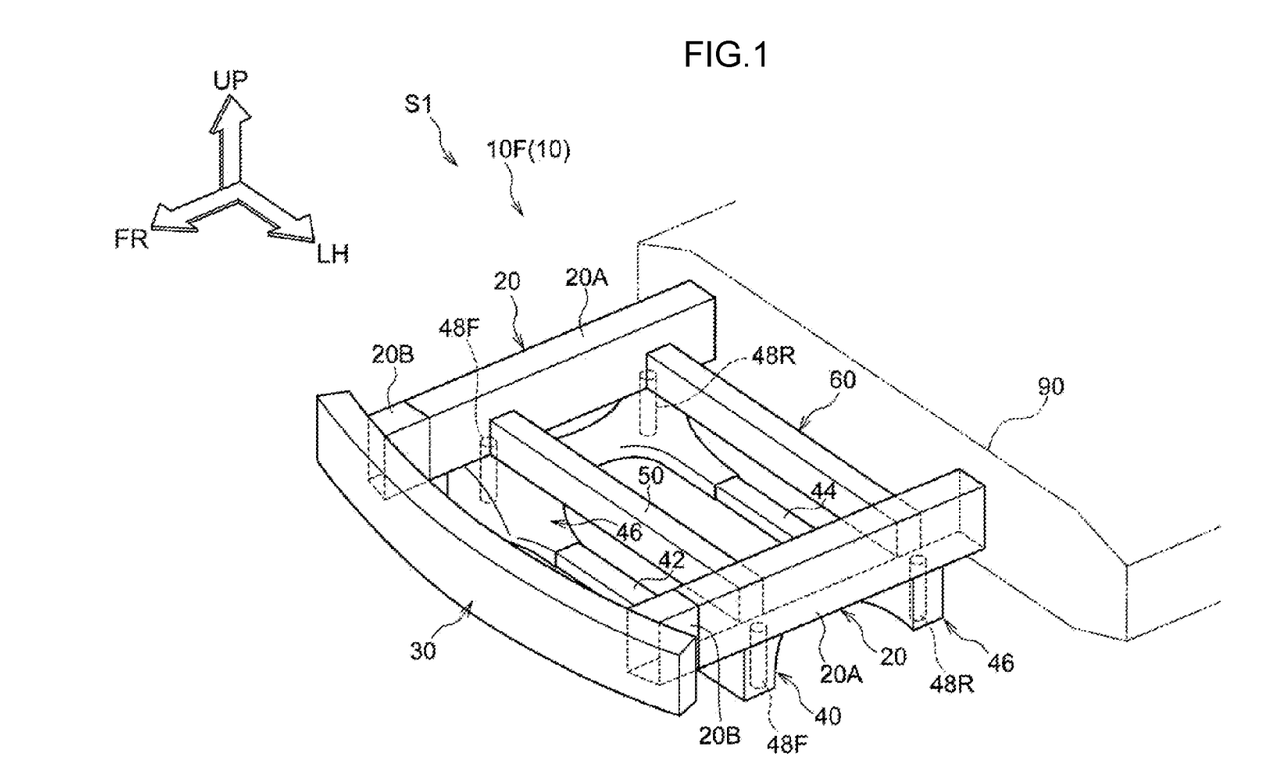
FIG. 1 is a perspective view that is seen from a vehicle obliquely front and upper side, and shows a vehicle front portion structure of an embodiment.
Figure 2:
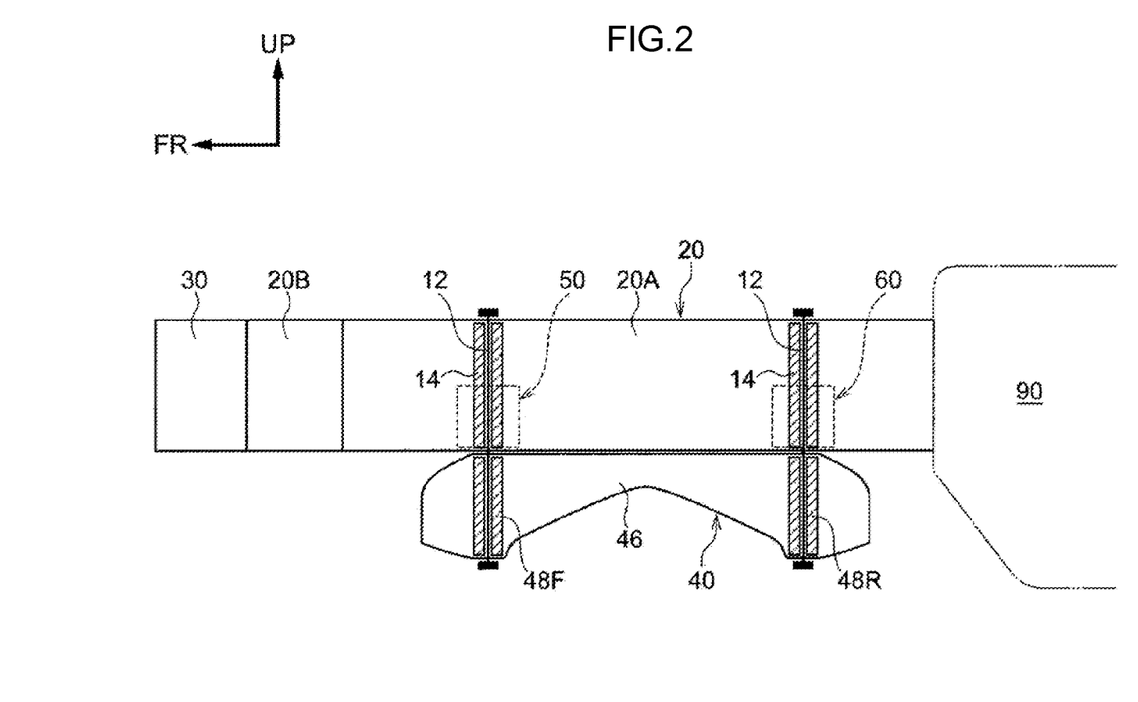
Figure 3:
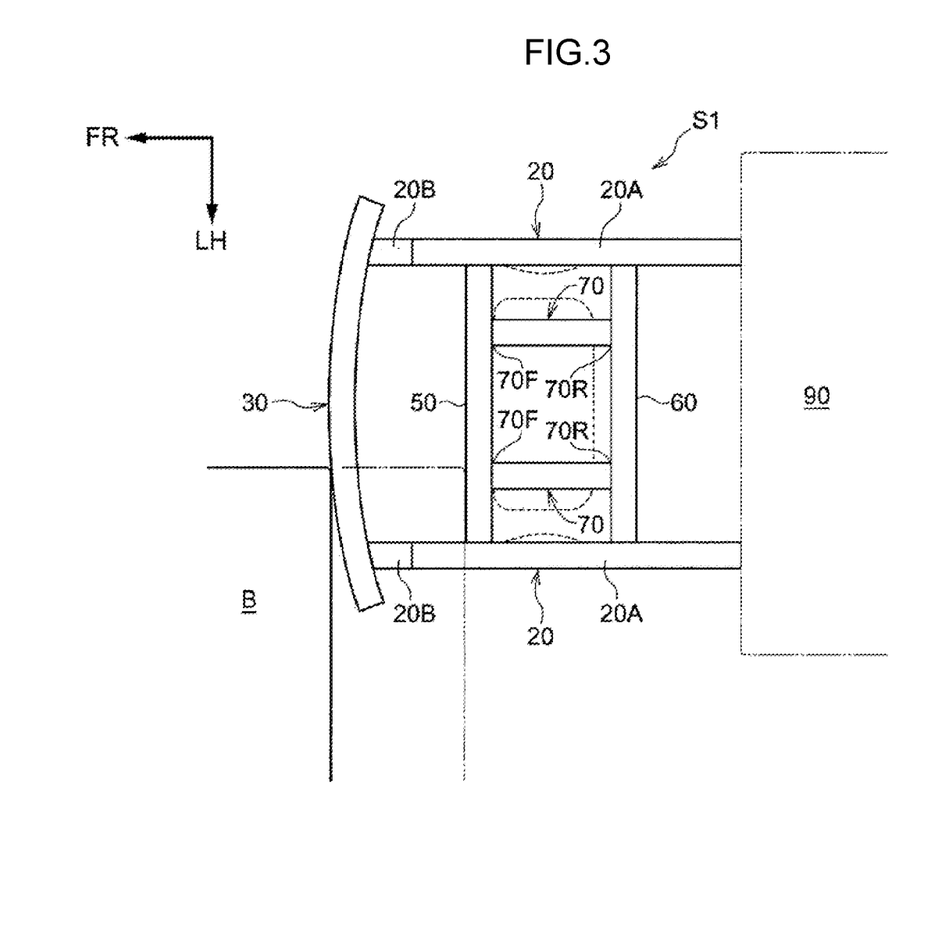
FIG. 3 is a plan view showing a vehicle front portion structure relating to a first embodiment.

As shown in FIG. 1 through FIG. 3, a pair of left and right front side members 20 are provided at a vehicle front portion 10F. The front side members 20 extend along the vehicle longitudinal direction, and are provided as a left-right pair symmetrically with respect to the transverse direction center of a vehicle 10. The cross-sectional shape orthogonal to the length direction of the front side member 20 is a closed cross-sectional structure that is shaped as a rectangle that is long in the vehicle vertical direction. Ribs are provided within the closed cross-sections of the front side members 20, which are closed cross-sectional structures, so as to divided the closed cross-sections into upper and lower portions.

The vicinity of the front end of the front side member 20 is made to be a low-strength portion 20B whose strength with respect to load in the vehicle longitudinal direction is set to be lower than that of a general portion 20A. As the way of providing the low-strength portion 20B, for example, a method is employed in which a crash box, which is formed as a body separate from the general portion 20A of the front side member 20, is joined to the front side of the general portion 20A of the front side member 20, or the like. The rear end of the front side member 20 is connected to a floor frame 90 that forms the frame of the floor portion of the vehicle 10. The front side members 20 function to absorb collision energy by being compressed in the length direction (axial direction) at the time of a front collision.

(Bumper RF 30)

A bumper reinforcement (hereinafter called "bumper RF") 30 that extends along the vehicle transverse direction is provided at the front sides of the pair of left and right front side members 20 so as to connect the pair of left and right front side members 20. The bumper RF 30 is formed in the shape of a bow as seen in a vehicle plan view, so as to be displaced toward the vehicle rear side while heading toward the vehicle transverse direction outer sides. The cross-sectional shape orthogonal to the length direction of the bumper RF 30 is rectangular, and the front ends of the pair of left and right front side members 20 are joined to the rear surface of the bumper RF 30. An absorber that is formed by a resin foamed body for example is disposed in front of the bumper RF 30, and a bumper cover that forms the design surface of the vehicle front portion is disposed even further forward.

(Suspension Member 40)

A suspension member 40 that supports a pair of left and right suspension arms is provided beneath the pair of left and right front side members 20. The suspension member 40 is joined to the pair of left and right front side members 20 from the vehicle lower side.

The suspension member 40 is structured to include a front cross 42 that extends in the vehicle transverse direction, a rear cross 44 that extends in the vehicle transverse direction at the rear side of the front cross 42, and a pair of left and right supporting portions 46 that longitudinally connect the vehicle transverse direction outer side end portions of the front cross 42 and the rear cross 44 and that support the suspension arms. Front side joining portions 48F, which are for joining the suspension member 40 to the front side members 20, are formed at the front portions of the pair of left and right supporting portions 46, respectively. Rear side joining portions 48R, which are for joining the suspension member 40 to the front side members 20, are formed at the rear portions of the pair of left and right supporting portions 46, respectively. The front side joining portions 48F and the rear side joining portions 48R are both disposed directly beneath the general portions 20A of the front side members 20, and are joined to the front side members 20 by fastening members 12 whose axial directions are the vehicle vertical direction.

As shown in FIG. 2, the fastening members 12 at the front side joining portions 48F and the rear side joining portions 48R are disposed so as to pass through the interiors of the closed cross-sections of the front side members 20 that are made to be closed cross-sectional structures. Further, collars 14 are provided at the interiors of the closed cross-sections of the front side members 20, and the fastening members 12 are in states of being inserted-through the interiors of these collars 14.

A first lateral connecting member 50 is provided between the pair of left and right front side members 20. Due thereto, as shown in FIG. 2, the front side members 20 and the first lateral connecting member 50 overlap as seen in a vehicle side view. In further detail, when imagining that the front side member 20 is divided into an upper portion and a lower portion, the first lateral connecting member 50 overlaps the lower portions of the front side members 20 as seen in a vehicle side view.

The first lateral connecting member 50 connects the pair of left and right front side members 20, parallel to the vehicle transverse direction. The length direction of the first lateral connecting member 50 is a direction that is parallel to the vehicle transverse direction. The first lateral connecting member 50 is joined to the front side members 20 by welding for example. As shown in FIG. 2, the vehicle longitudinal direction position of the portion, to which the first lateral connecting member 50 is joined, at the front side member 20 coincides with the vehicle longitudinal direction position of the portion to which the front side joining portion 48F of the suspension member 40 is joined.

(Second Lateral Connecting Member 60)

A second lateral connecting member 60 is provided between the pair of left and right front side members 20, at the rear side of the first lateral connecting member 50. Due thereto, as shown in FIG. 2, the front side members 20 and the second lateral connecting member 60 overlap as seen in a vehicle side view. In further detail, when imagining that the front side member 20 is divided into an upper portion and a lower portion, the second lateral connecting member 60 overlaps the lower portions of the front side members 20 as seen in a vehicle side view.

The second lateral connecting member 60 connects the pair of left and right front side members 20, parallel to the vehicle transverse direction. The length direction of the second lateral connecting member 60 is a direction that is parallel to the vehicle transverse direction. The second lateral connecting member 60 is joined to the front side members 20 by welding for example. As shown in FIG. 2, the vehicle longitudinal direction position of the portion, to which the second lateral connecting member 60 is joined, at the front side member 20 coincides with the vehicle longitudinal direction position of the portion to which the rear side joining portion 48R of the suspension member 40 is joined.

(Longitudinal Connecting Members 70)

As shown in FIG. 3, a pair of left and right longitudinal connecting members 70 are provided so as to connect the first lateral connecting member 50 and the second lateral connecting member 60. (Note that illustration of the longitudinal connecting members 70 is omitted in FIG. 1 and FIG. 2 in order to simplify the drawings.) The pair of left and right longitudinal connecting members 70 are provided so as to be symmetrical with respect to the transverse direction center of the vehicle 10. The length directions of both of the pair of left and right longitudinal connecting members 70 are directions parallel to the vehicle longitudinal direction. The vehicle transverse direction position where a front end portion 70F of the longitudinal connecting member 70 at the left side is provided is a position that is toward the vehicle transverse direction inner side by about 40% of the vehicle transverse dimension from the left side end of the vehicle 10. The vehicle transverse direction position where the front end portion 70F of the longitudinal connecting member 70 at the right side is provided is a position that is toward the vehicle transverse direction inner side by about 40% of the vehicle transverse dimension from the right side end of the vehicle 10.

The front end portions 70F and rear end portions 70R of the pair of left and right longitudinal connecting members 70 are joined by welding for example to the first lateral connecting member 50 and the second lateral connecting member 60, respectively.

The sizes of the cross-sections of the first lateral connecting member 50, the second lateral connecting member 60 and the longitudinal connecting members 70 are all sizes that are greater than or equal to ⅓ of the size of the cross-sections of the front side members 20. In detail, in the present embodiment, the cross-sectional shapes of the first lateral connecting member 50, the second lateral connecting member 60 and the longitudinal connecting members 70 are all substantially square, and the length of one side thereof is made to be approximately ½ of the vertical dimension of the front side members 20 (the dimension in the cross-sectional length direction of the front side members 20 whose length direction is the vertical direction).

Operation and Effects

Operation and effects of the first embodiment are described next.

In the vehicle front portion structure S1 relating to the first embodiment, at the time of a front collision, collision load is transmitted to the pair of left and right front side members 20 that are disposed at the vehicle front portion 10F and extend along the vehicle longitudinal direction. Here, the first lateral connecting member 50, which connects the pair of left and right front side members 20 parallel to the vehicle transverse direction, is disposed between the pair of left and right front side members 20. Therefore, for example, at the time of an offset collision such as shown by the two-dot chain line in FIG. 3, the collision load, which is transmitted to the front side member 20 that is at the side of the collision (the vehicle left side) among the pair of left and right front side members 20, can be transmitted via the first lateral connecting member 50 to the front side member 20 that is at the side opposite the collision (the vehicle right side).

Moreover, as shown in FIG. 2, the suspension member 40 is disposed at the vehicle lower side of the pair of left and right front side members 20. The suspension member 40 is joined to the pair of left and right front side members 20 at the pair of left and right front side joining portions 48F and the pair of left and right rear side joining portions 48R. Further, the vehicle longitudinal direction positions of the portions, to which the first lateral connecting member 50 is joined, at the pair of left and right front side members 20 coincide with the vehicle longitudinal direction positions of the portions to which the front side joining portions 48F of the suspension member 40 are joined. Namely, the vehicle longitudinal direction positions of portions joined to other members (the suspension member 40 and the first lateral connecting member 50), where it is assumed that there will be incomplete crushing at the time of a collision, coincide. Therefore, uncrushed portions that arise at the front side members 20 can be kept to a minimum.

Further, in the vehicle front portion structure S1 relating to the first embodiment, in addition to the first lateral connecting member 50, the second lateral connecting member 60, which connects the pair of left and right front side members 20 parallel to the vehicle transverse direction at further toward the vehicle rear side than the first lateral connecting member 50, is disposed between the pair of left and right front side members 20. Therefore, for example, at the time of an offset collision such as shown by the two-dot chain line in FIG. 3, the collision load, which is transmitted to the front side member 20 that is at the side of the collision (the vehicle left side) among the pair of left and right front side members 20, can be transmitted to the front side member that is at the side opposite the collision (the vehicle right side) via not only the first lateral connecting member 50 but the second lateral connecting member 60 as well.

Moreover, the vehicle longitudinal direction positions of the portions, to which the second lateral connecting member 60 is joined, at the pair of left and right front side members 20 coincide with the vehicle longitudinal direction positions of the portions to which the rear side joining portions 48R of the suspension member 40 are joined. Therefore, uncrushed portions that arise at the front side members 20 can be kept to a minimum.

Moreover, in the vehicle front portion structure S1 relating to the first embodiment, the pair of left and right longitudinal connecting members 70 connect the first lateral connecting member 50 and the second lateral connecting member 60. Further, the front end portions 70F of the pair of left and right longitudinal connecting members 70 are disposed so as to be offset with respect to the transverse direction center of the vehicle. Therefore, for example, at the time of an offset collision such as shown by the two-dot chain line in FIG. 3 (e.g., an overlap ratio of 40%), the collision load is transmitted effectively to the longitudinal connecting member 70 that is at the side of the collision (the vehicle left side) among the pair of left and right longitudinal connecting members 70. Further, the collision load is transmitted from the longitudinal connecting member 70 at the side of the collision (the vehicle left side) to the second lateral connecting member 60, and is transmitted to the front side member 20 at the side opposite the collision (the vehicle right side).

Here, both of the pair of left and right longitudinal connecting members 70 are disposed parallel to the vehicle longitudinal direction. Therefore, as compared with a case in which the longitudinal connecting members 70 are disposed at inclines so as to move away from the transverse direction central position of the vehicle while heading toward the vehicle rear side, the collision load can be transmitted effectively to the front side member that is at the side opposite the collision.

Second Embodiment

A vehicle front portion structure S2 relating to a second embodiment of the present disclosure is described next by using FIG. 4.

Figure 4:
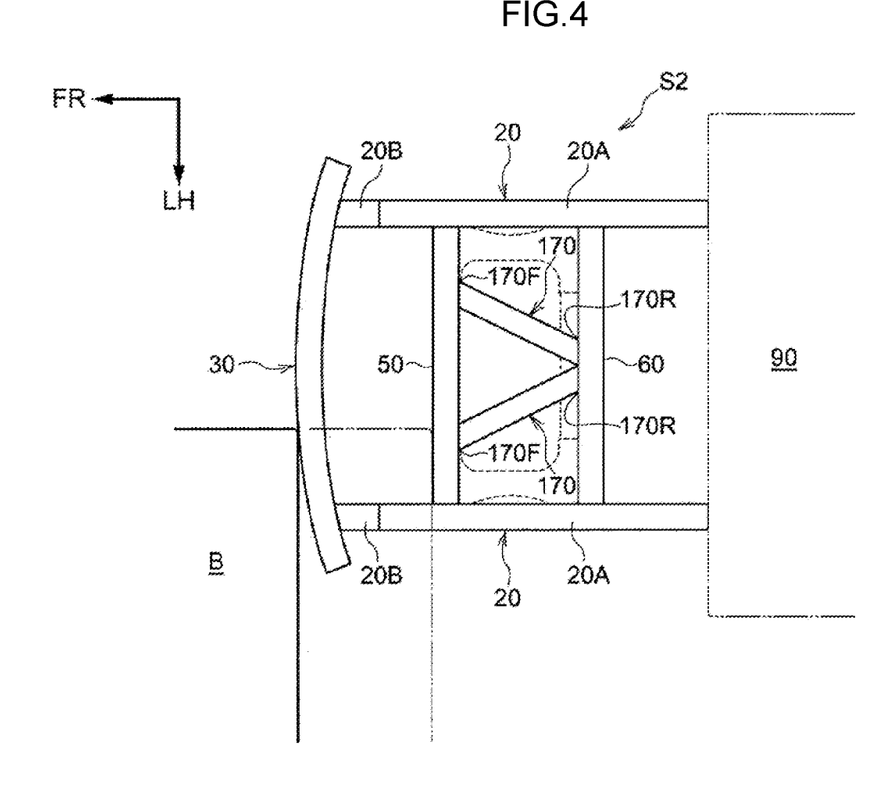
FIG. 4 is a plan view showing a vehicle front portion structure relating to a second embodiment.

As shown in FIG. 4, in the vehicle front portion structure S2 relating to the second embodiment, the directions of placement of a pair of left and right longitudinal connecting members 170 differ from the first embodiment, and other points are the same as in the first embodiment.

Hereinafter, description is given of the portion that differs from the first embodiment (the pair of left and right longitudinal connecting members 170), and portions that are the same as the first embodiment are denoted by the same reference numerals in the drawings, and detailed description thereof is omitted.

(Longitudinal Connecting Members 170)

As shown in FIG. 4, in the second embodiment, the pair of left and right longitudinal connecting members 170 are provided so as to connect the first lateral connecting member 50 and the second lateral connecting member 60. The pair of left and right longitudinal connecting members 170 are provided symmetrically with respect to the transverse direction center of the vehicle 10. The pair of left and right longitudinal connecting members 170 both extend rectilinearly, and the length directions thereof are oriented at inclines with respect to the vehicle longitudinal direction. The vehicle transverse direction position where a front end portion 170F of the longitudinal connecting member 170 at the left side is provided is a position that is toward the vehicle transverse direction inner side by about 40% of the vehicle transverse dimension from the left side end of the vehicle 10. The vehicle transverse direction position where the front end portion 170F of the longitudinal connecting member 170 at the right side is provided is a position that is toward the vehicle transverse direction inner side by about 40% of the vehicle transverse dimension from the right side end of the vehicle 10. On the other hand, the vehicle transverse direction position where a rear end portion 170R of the longitudinal connecting member 170 at the left side is provided is the vehicle transverse direction central portion of the vehicle 10. The vehicle transverse direction position where the rear end portion 170R of the longitudinal connecting member 170 at the right side is provided is the vehicle transverse direction central portion of the vehicle 10.

In this way, in the vehicle front portion structure S2 relating to the second embodiment, the front end portions 170F of the pair of left and right longitudinal connecting members 170 are disposed so as to be offset with respect to the transverse direction center of the vehicle 10. The pair of left and right longitudinal connecting members 170 are both disposed at inclines so as to approach the transverse direction central position of the vehicle while heading toward the vehicle rear side.

Operation and Effects

Operation and effects of the second embodiment are described next. Note that explanation of operations relating to structures that are the same as those of the first embodiment are omitted as needed, and the operation and effects that differ from the first embodiment are described.

In the vehicle front portion structure S2 relating to the second embodiment, the pair of left and right longitudinal connecting members 170 connect the first lateral connecting member 50 and the second lateral connecting member 60. Further, the front end portions 170F of the pair of left and right longitudinal connecting members 170 are disposed so as to be offset with respect to the transverse direction center of the vehicle 10. Therefore, for example, at the time of an offset collision such as shown by the two-dot chain line in FIG. 5 (e.g., an overlap ratio of 40%), the collision load is transmitted effectively to the longitudinal connecting member 70 that is at the side of the collision (the vehicle left side) among the pair of left and right longitudinal connecting members 170. Further, the collision load is transmitted from the longitudinal connecting member 170 that is at the side of the collision (the vehicle left side) to the second lateral connecting member 60, and is transmitted to the front side member 20 that is at the side opposite the collision (the vehicle right side). Here, both of the pair of left and right longitudinal connecting members 170 are disposed at inclines so as to approach the transverse direction central position of the vehicle while heading toward the vehicle rear side. Therefore, the collision load can be transmitted effectively to the front side member 20 that is at the side opposite the collision (the vehicle right side), as compared with a case in which the longitudinal connecting members are disposed at inclines so as to move away from the transverse direction central position of the vehicle while heading toward the vehicle rear side, or a case in which the longitudinal connecting members 70 are disposed parallel to the vehicle longitudinal direction as in the first embodiment.

Third Embodiment

A vehicle front portion structure S3 relating to a third embodiment of the present disclosure is described next by using FIG. 5.

Figure 5:
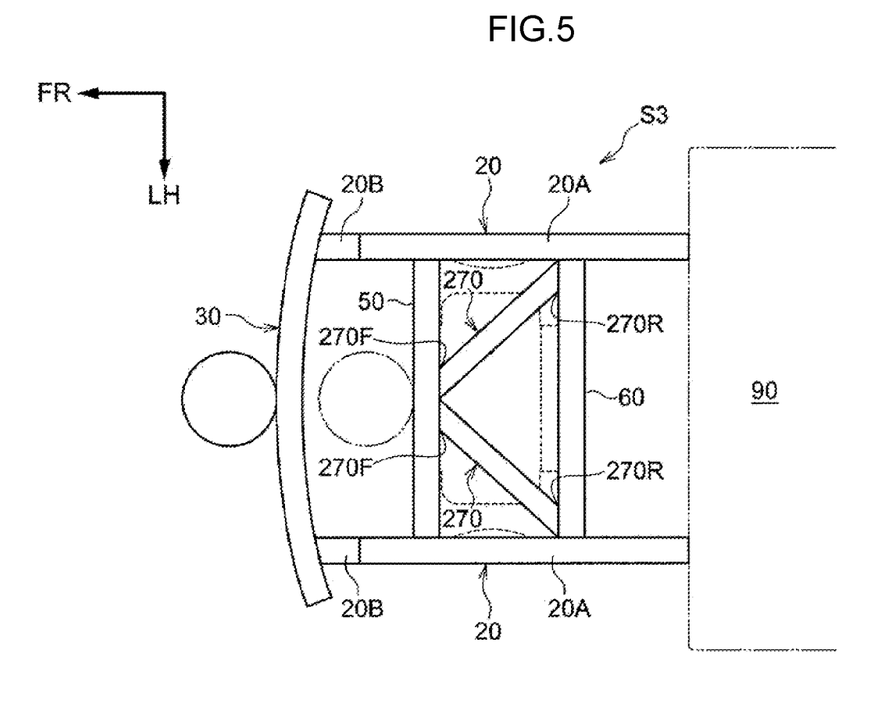
FIG. 5 is a plan view showing a vehicle front portion structure relating to a third embodiment.

As shown in FIG. 5, in the vehicle front portion structure S3 relating to the third embodiment, the directions of placement of a pair of left and right longitudinal connecting members 270 differ from the first embodiment and the second embodiment, and other points are the same as in the first embodiment and the second embodiment.

Hereinafter, description is given of the portion that differs from the first embodiment and the second embodiment (the pair of left and right longitudinal connecting members 270), and portions that are the same as the first embodiment and the second embodiment are denoted by the same reference numerals in the drawings, and detailed description thereof is omitted.

(Longitudinal Connecting Members 270)

As shown in FIG. 5, in the third embodiment, the pair of left and right longitudinal connecting members 270 are provided so as to connect the first lateral connecting member 50 and the second lateral connecting member 60. The pair of left and right longitudinal connecting members 270 are provided symmetrically with respect to the transverse direction center of the vehicle 10. The pair of left and right longitudinal connecting members 270 both extend rectilinearly, and the length directions thereof are oriented at inclines with respect to the vehicle longitudinal direction. The vehicle transverse direction position where a front end portion 270F of the longitudinal connecting portion 270 at the left side is provided is the vehicle transverse direction central portion of the vehicle 10. The vehicle transverse direction position where the front end portion 270F of the longitudinal connecting portion 270 at the right side is provided is the vehicle transverse direction central portion of the vehicle 10. On the other hand, the vehicle transverse direction position where a rear end portion 270R of the longitudinal connecting member 270 at the left side is provided is in a vicinity of the vehicle transverse direction left side end portion of the second lateral connecting member 60. The vehicle transverse direction position where the rear end portion 270R of the longitudinal connecting member 270 at the right side is provided is in a vicinity of the vehicle transverse direction right side end portion of the second lateral connecting member 60.

In this way, in the vehicle front portion structure S3 relating to the third embodiment, the front end portions 270F of the pair of left and right longitudinal connecting members 270 are disposed at the vehicle transverse direction central portion of the vehicle 10. The pair of left and right longitudinal connecting members 270 are both disposed at inclines so as to move away from the transverse direction central position of the vehicle 10.

Operation and Effects

Operation and effects of the third embodiment are described next. Note that explanation of operations relating to structures that are the same as those of the first embodiment and the second embodiment is omitted as needed, and the operation and effects that differ from the first embodiment and the second embodiment are described.

In the vehicle front portion structure S3 relating to the third embodiment, the pair of left and right longitudinal connecting members 270 connect the first lateral connecting member 50 and the second lateral connecting member 60. Further, the front end portions 270F of the pair of left and right longitudinal connecting members 270 are disposed at the vehicle transverse direction central portion of the vehicle 10. Therefore, for example, when a collision with a pole occurs at the vehicle central portion as shown by the two-dot chain line in FIG. 5, the collision load is transmitted effectively to both of the pair of left and right longitudinal connecting members 270.

Moreover, the pair of left and right longitudinal connecting members 270 are both disposed at inclines so as to move away from the vehicle transverse direction central position of the vehicle 10. Therefore, the left and right longitudinal connecting members 270 can transmit the collision load to both of the pair of left and right front side members 20.

Figure 6:
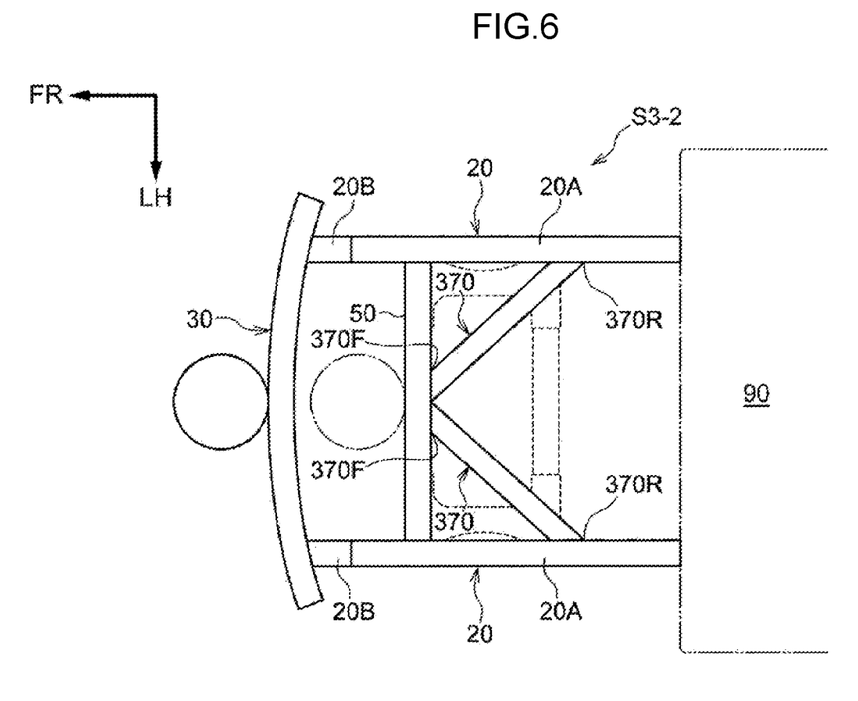
FIG. 6 is a plan view showing a vehicle front portion structure relating to a modified example of the third embodiment.

Note that the above-described third embodiment describes an example in which the pair of left and right longitudinal connecting members 270 connect the first lateral connecting member 50 and the second lateral connecting member 60. However, as shown in FIG. 6, a pair of left and right longitudinal connecting members 370 that connect the first lateral connecting member 50 and the pair of left and right front side members 20, and not the first lateral connecting member 50 and the second lateral connecting member 60, may be provided (vehicle front portion structure S3-2). In this modified example of the third embodiment as well, front end portions 370F of the pair of left and right longitudinal connecting members 370 are disposed at the vehicle transverse direction central portion of the vehicle 10. The pair of left and right longitudinal connecting members 370 are both disposed at inclines so as to move away from the transverse direction central position of the vehicle 10. Rear end portions 370R of the pair of left and right longitudinal connecting members 370 are joined to (the vehicle transverse direction inner side portions of) the front side members 20. Note that the second lateral connecting member 60 is not provided in the vehicle front portion structure S3-2 relating to the modified example.

Therefore, for example, when a collision with a pole occurs at the vehicle central portion as shown by the two-dot chain line in FIG. 6, the collision load is transmitted effectively to both of the pair of left and right longitudinal connecting members 370. Moreover, because the pair of left and right longitudinal connecting members 370 are both disposed at inclines so as to move away from the transverse direction central position of the vehicle 10, the left and right longitudinal connecting members 370 can transmit the collision load to both of the pair of left and right front side members 20.

Fourth Embodiment

A vehicle front portion structure S4 relating to a fourth embodiment of the present disclosure is described next by using FIG. 7.

Figure 7:
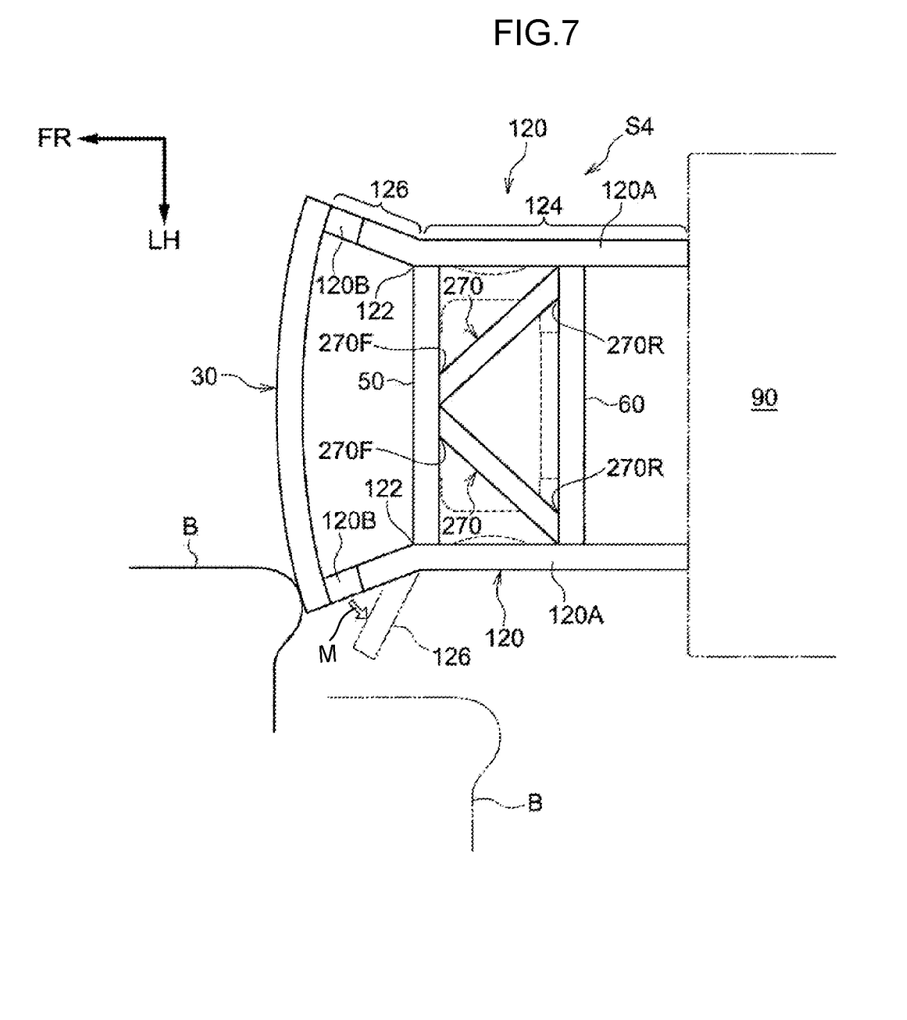
FIG. 7 is a plan view showing a vehicle front portion structure relating to a fourth embodiment.

As shown in FIG. 7, in the vehicle front portion structure S4 relating to the fourth embodiment, the structure of a pair of left and right front side members 120 differs from the third embodiment (see FIG. 5), and other points are the same as in the third embodiment. Hereinafter, description is given of the portion that differs from the third embodiment (the pair of left and right front side members 120), and portions that are the same as the third embodiment are denoted by the same reference numerals in the drawings, and detailed description thereof is omitted.

(Front Side Members 120)

As shown in FIG. 7, the pair of left and right front side members 120 are provided at the vehicle front portion 10F. The front side members 120 extend along the vehicle longitudinal direction, and are provided as a left/right pair symmetrically with respect to the transverse direction center of the vehicle 10. The front side members 120 are closed cross-sectional structures whose cross-sectional shapes orthogonal to the length direction are rectangles whose lengths are in the vehicle vertical direction.

Vicinities of the front ends of the front side members 120 are made to be low-strength portions 120B whose strength with respect to load in the vehicle longitudinal direction is set to be lower than that of general portions 120A. The rear ends of the front side members 120 are connected to the floor frame 90 that structures the frame of the floor portion of the vehicle 10.

The length directions of the portion of the front side member 120, which is at the vehicle rear side with respect to the position to which the first lateral connecting member 50 is joined, and the portion of the front side member 120 that is at the vehicle front side of this position, are directions that differ from one another. In detail, the portion to which the first lateral connecting member 50 is joined at the front side member 120 is a bent portion 122 where the orientations of the length direction of the front side member 120 change. The portion, which is further toward the rear side than the bent portion 122, of the front side member 120 is a parallel portion 124, and the portion, which is further toward the front side than the bent portion 122, is an open portion 126. The parallel portions 124 of the pair of left and right front side members 120 are substantially parallel to one another. On the other hand, the open portions 126 of the pair of left and right front side members 120 are structures that open in directions of moving away from one another while heading toward the vehicle front side.

Operation and Effects

Operation and effects of the fourth embodiment are described next. Note that explanation of operations relating to structures that are the same as those of the third embodiment are omitted as needed, and the operation and effects that differ from the third embodiment are described.

In the vehicle front portion structure S4 relating to the fourth embodiment, the portions (the open portions 126), which are further toward the vehicle front side than the positions to which the first lateral connecting member 50 is joined, of the pair of left and right front side members 120 are bent at inclines with respect to the vehicle longitudinal direction so as to open toward the vehicle transverse direction outer sides. Therefore, for example, at the time of a small overlap collision such as shown by the two-dot chain line in FIG. 7, the vicinity of the front end (i.e., the portion that is further toward the vehicle front side than the position to which the first lateral connecting member 50 is joined) of the front side member 120 that is at the side of the collision (the vehicle left side) deforms so as to rotate toward the vehicle outer side with the fulcrum being a vicinity of the position to which the first lateral connecting member 50 is joined (refer to arrow M in FIG. 7). Due thereto, a collision body B can be moved toward the side portion (the left-side side portion) of the vehicle 10. In particular, the portions (the open portions 126), which are bent at inclines with respect to the vehicle longitudinal direction so as to open toward the vehicle transverse direction outer sides, of the front side members 120 coincide with the portions which are further toward the vehicle front side than the positions to which the first lateral connecting member 50 is joined. Therefore, the collision body can effectively be moved toward the side portion of the vehicle.

Note that the fourth embodiment describes an example in which the structures other than the pair of left and right front side members 120 are the same as those of the third embodiment. However, the present disclosure is not limited to this, and structures other than the pair of left and right front side members 120 (e.g., the pair of left and right longitudinal connecting members, or the second lateral connecting member) may be made to be the same as those of the first embodiment, the second embodiment or the modified example of the third embodiment.

Supplementary Description of Embodiments

Note that the above-described embodiments describe examples in which the joining of the first lateral connecting member 50 and the second lateral connecting member 60 to the front side members 20, and the joining of the longitudinal connecting members 70 to the first lateral connecting member 50, and the like are joining by welding. However, the present disclosure is not limited to this, and various forms of joining can be applied.

Further, the above embodiments describe examples in which, when imagining that the front side member 20 is divided into an upper portion and a lower portion, the first lateral connecting member 50 and the second lateral connecting member 60 overlap the lower portions of the front side members 20 as seen in a vehicle side view. However, the present disclosure is not limited to this. For example, the first lateral connecting member and the second lateral connecting member may overlap the vertical direction central portions of the front side members as seen in a vehicle side view.

Further, the above embodiments describe the front side members 20, 120 that are closed cross-sectional structures whose cross-sectional shapes orthogonal to the length directions are rectangles that are long in the vehicle vertical direction. However, the present disclosure is not limited to this, and various cross-sectional shapes can be employed. Further, the above embodiments describe the first lateral connecting member 50, the second lateral connecting member, and the longitudinal connecting members 70 whose cross-sectional shapes are all substantially square. However, the present disclosure is not limited to this, and various cross-sectional shapes can be employed.

The above embodiments describe examples in which the form of joining the suspension member 40 to the front side members 20 is carried out by the fastening members 12 that pass-through the front side members 20 vertically. However, the present disclosure is not limited to this. For example, the fastening members do not have to pass-through the entire front side members, and a form of joining other than fastening may be employed.

A vehicle front portion structure of a first aspect includes: a pair of left and right front side members that are disposed at a vehicle front portion and that extend along a vehicle longitudinal direction; a suspension member that is disposed at a vehicle lower side of the pair of left and right front side members, and that is joined to the pair of left and right front side members at a pair of left and right front side joining portions and at a pair of left and right rear side joining portions; and a first lateral connecting member that is disposed between the pair of left and right front side members, and that connects the pair of left and right front side members parallel to a vehicle transverse direction, wherein vehicle longitudinal direction positions of portions, to which the first lateral connecting member is joined, at the pair of left and right front side members coincide with vehicle longitudinal direction positions of portions, to which the front side joining portions of the suspension member are joined, at the pair of left and right front side members.

In the vehicle front portion structure of the first aspect, at the time of a front collision (note that, in the present specification, when simply the term front collision is used, it includes various forms of front collisions such as head-on collisions, oblique collisions, offset front collisions, collisions with a pole, and the like), collision load is transmitted to the pair of left and right front side members that are disposed at the vehicle front portion and that extend along the vehicle longitudinal direction. Here, the first lateral connecting member, which connects the pair of left and right front side members parallel to the vehicle transverse direction, is disposed between the pair of left and right front side members. Therefore, at the time of an offset collision or the like, the collision load that is transmitted to the front side member, which is at the side of the collision among the pair of left and right front side members, is transmitted via the first lateral connecting member to the front side member that is at the side opposite the collision.

Moreover, the suspension member is disposed at the vehicle lower side of the pair of left and right front side members. The suspension member is joined to the pair of left and right front side members at the pair of left and right front side joining portions and the pair of left and right rear side joining portions. Further, the vehicle longitudinal direction positions of the portions, to which the first lateral connecting member is joined, at the pair of left and right front side members coincide with the vehicle longitudinal direction positions of the portions to which the front side joining portions of the suspension member are joined. Namely, the vehicle longitudinal direction positions of portions joined to other members (the suspension member and the first lateral connecting member), where it is assumed that there will be incomplete crushing at the time of a collision, coincide. Therefore, uncrushed portions that arise at the front side members can be kept to a minimum.

A second aspect is the vehicle front portion structure of the first aspect that further includes a second lateral connecting member that is disposed between the pair of left and right front side members, and that connects the pair of left and right front side members parallel to the vehicle transverse direction, at further toward a vehicle rear side than the first lateral connecting member, wherein vehicle longitudinal direction positions of portions, to which the second lateral connecting member is joined, at the pair of left and right front side members coincide with vehicle longitudinal direction positions of portions, to which the rear side joining portions of the suspension member are joined, at the pair of left and right front side members.

In the vehicle front portion structure of the second aspect, in addition to the first lateral connecting member, the second lateral connecting member, which connects the pair of left and right front side members parallel to the vehicle transverse direction at further toward the vehicle rear side than the first lateral connecting member, is disposed between the pair of left and right front side members. Therefore, at the time of an offset collision or the like for example, the collision load, which is transmitted to the front side member that is at the side of the collision among the pair of left and right front side members, can be transmitted to the front side member that is at the side opposite the collision via not only the first lateral connecting member but the second lateral connecting member as well.

Moreover, the vehicle longitudinal direction positions of the portions, to which the second lateral connecting member is joined, at the pair of left and right front side members coincide with the vehicle longitudinal direction positions of the portions to which the rear side joining portions of the suspension member are joined. Therefore, uncrushed portions that arise at the front side members can be kept to a minimum.

A third aspect is the vehicle front portion structure of the first aspect that further includes: a second lateral connecting member that is disposed between the pair of left and right front side members, and that connects the pair of left and right front side members parallel to the vehicle transverse direction, at further toward a vehicle rear side than the first lateral connecting member; and a pair of left and right longitudinal connecting members that connect the first lateral connecting member and the second lateral connecting member, wherein front end portions of the pair of left and right longitudinal connecting members are disposed so as to be offset with respect to a transverse direction center of the vehicle, and wherein the pair of left and right longitudinal connecting members both are either disposed parallel to the vehicle longitudinal direction or disposed at inclines so as to approach a transverse direction central position of the vehicle while heading toward a vehicle rear side.

In the vehicle front portion structure of the third aspect, in addition to the first lateral connecting member, the second lateral connecting member, which connects the pair of left and right front side members parallel to the vehicle transverse direction at further toward the vehicle rear side than the first lateral connecting member, is disposed between the pair of left and right front side members. Therefore, at the time of an offset collision or the like for example, the collision load, which is transmitted to the front side member that is at the side of the collision among the pair of left and right front side members, can be transmitted to the front side member at the side opposite the collision via not only the first lateral connecting member but the second lateral connecting member as well.

Moreover, the pair of left and right longitudinal connecting members connect the first lateral connecting member and the second lateral connecting member. Further, the front end portions of the pair of left and right longitudinal connecting members are disposed so as to be offset with respect to the transverse direction center of the vehicle. Therefore, for example, at the time of an offset collision (e.g., an overlap ratio of 40%), the collision load is transmitted effectively to the longitudinal connecting member that is at the side of the collision among the pair of left and right longitudinal connecting members. Further, the collision load is transmitted from the longitudinal connecting member that is at the side of the collision to the second lateral connecting member, and is transmitted to the front side member at the side opposite the collision.

Here, both of the pair of left and right longitudinal connecting members either are disposed parallel to the vehicle longitudinal direction, or are disposed at inclines so as to approach the transverse direction central position of the vehicle while heading toward the vehicle rear side. Therefore, as compared with a case in which the longitudinal connecting members are disposed at inclines so as to move away from the vehicle transverse direction central position of the vehicle while heading toward the vehicle rear side, the collision load can be transmitted effectively to the front side member that is at the side opposite the collision.

A fourth aspect is the vehicle front portion structure of the first aspect that further includes: a second lateral connecting member that is disposed between the pair of left and right front side members, and that connects the pair of left and right front side members parallel to the vehicle transverse direction, at further toward a vehicle rear side than the first lateral connecting member; and a pair of left and right longitudinal connecting members that connect the first lateral connecting member and the second lateral connecting member, wherein front end portions of the pair of left and right longitudinal connecting members are disposed at a vehicle transverse direction central portion of the vehicle, and wherein the pair of left and right longitudinal connecting members both are disposed at inclines so as to go away from a transverse direction central position of the vehicle.

In the vehicle front portion structure of the fourth aspect, in addition to the first lateral connecting member, the second lateral connecting member, which connects the pair of left and right front side members parallel to the vehicle transverse direction at further toward the vehicle rear side than the first lateral connecting members, is disposed between the pair of left and right front side members. Therefore, at the time of an offset collision or the like for example, the collision load, which is transmitted to the front side member that is at the side of the collision among the pair of left and right front side members, can be transmitted to the front side member that is at the side opposite the collision via not only the first lateral connecting member but the second lateral connecting member as well.

Further, the pair of left and right longitudinal connecting members connect the first lateral connecting member and the second lateral connecting member. Further, the front end portions of the pair of left and right longitudinal connecting members are disposed at the vehicle transverse direction central portion of the vehicle. Therefore, for example, when a collision with a pole occurs at the vehicle central portion, the collision load is transmitted effectively to both of the pair of left and right longitudinal connecting members. Moreover, the pair of left and right longitudinal connecting members are both disposed at inclines so as to move away from the transverse direction central position of the vehicle. Therefore, the left and right longitudinal connecting members can transmit the collision load to both of the pair of left and right front side members.

A fifth aspect is the vehicle front portion structure of the first aspect that further includes: a pair of left and right longitudinal connecting members that connect the first lateral connecting member and the pair of left and right front side members, wherein front end portions of the pair of left and right longitudinal connecting members are disposed at a vehicle transverse direction central portion of the vehicle, and wherein the pair of left and right longitudinal connecting members are disposed at inclines so as to go away from a transverse direction central position of the vehicle.

In the vehicle front portion structure of the fifth aspect, the pair of left and right longitudinal connecting members connect the first transverse connecting member and the pair of left and right front side members. Further, the front end portions of the pair of left and right longitudinal connecting members are disposed at the vehicle transverse direction central portion of the vehicle. Therefore, for example, when a collision with a pole occurs at the vehicle central portion, the collision load is transmitted effectively to both of the pair of left and right longitudinal connecting members. Moreover, the pair of left and right longitudinal connecting members are both disposed at inclines so as to move away from the transverse direction central position of the vehicle. Therefore, the left and right longitudinal connecting members can transmit the collision load to both of the pair of left and right front side members.

The sixth aspect is the vehicle front portion structure of any of the first to the fifth aspect, wherein portions, which are further toward a vehicle front side than positions to which the first lateral connecting member is joined, at the pair of left and right front side members are bent at inclines with respect to the vehicle longitudinal direction so as to open toward vehicle transverse direction outer sides.

In the vehicle front portion structure of the sixth aspect, the portions, which are further toward the vehicle front side than the positions where the first lateral connecting member is joined, of the pair of left and right front side members are bent at inclines with respect to the vehicle longitudinal direction so as to open toward the vehicle transverse direction outer sides. Therefore, for example, at the time of a small overlap collision, the vicinity of the front end (i.e., the portion that is further toward the vehicle front side than the position to which the first lateral connecting member is joined) of the front side member that is at the side of the collision deforms so as to rotate toward the vehicle outer side with the fulcrum being a vicinity of the position to which the first lateral connecting member is joined. Due thereto, the collision body can be moved toward the side portion of the vehicle. In particular, the portions, which are bent at inclines with respect to the vehicle longitudinal direction so as to open toward the vehicle transverse direction outer sides, of the front side members coincide with the portions which are further toward the vehicle front side than the positions to which the first lateral connecting member is joined. Therefore, the collision body can effectively be moved toward the side portion of the vehicle.

As described above, the vehicle front portion structure relating to the present disclosure efficiently utilizes the frame structure at the side opposite the collision at the time of an offset collision or the like, and can keep uncrushed portions that arise at front side members to a minimum, and has excellent collision safety performance.

What is claimed is:

1. A vehicle front portion structure, comprising:
a pair of left and right front side members that are disposed at a vehicle front portion and that extend along a vehicle longitudinal direction;
a suspension member that is disposed at a vehicle lower side of the pair of left and right front side members, and that is joined to the pair of left and right front side members at a pair of left and right front side joining portions and at a pair of left and right rear side joining portions; and
a first lateral connecting member that is disposed above the suspension member and attached to opposing faces of the pair of left and right front side members, and that connects the pair of left and right front side members parallel to a vehicle transverse direction,
wherein vehicle longitudinal direction positions of portions, to which the first lateral connecting member is joined, at the pair of left and right front side members coincide with vehicle longitudinal direction positions of portions, to which the front side joining portions of the suspension member are joined, at the pair of left and right front side members.

2. The vehicle front portion structure of claim 1, further comprising a second lateral connecting member that is disposed between the pair of left and right front side members, and that connects the pair of left and right front side members parallel to the vehicle transverse direction, at further toward a vehicle rear side than the first lateral connecting member,
wherein vehicle longitudinal direction positions of portions, to which the second lateral connecting member is joined, at the pair of left and right front side members coincide with vehicle longitudinal direction positions of portions, to which the rear side joining portions of the suspension member are joined, at the pair of left and right front side members.

3. The vehicle front portion structure of claim 1, further comprising:
a second lateral connecting member that is disposed between the pair of left and right front side members, and that connects the pair of left and right front side members parallel to the vehicle transverse direction, at further toward a vehicle rear side than the first lateral connecting member; and
a pair of left and right longitudinal connecting members that connect the first lateral connecting member and the second lateral connecting member,
wherein front end portions of the pair of left and right longitudinal connecting members are disposed so as to be offset with respect to a transverse direction center of the vehicle, and
wherein the pair of left and right longitudinal connecting members both are disposed parallel to the vehicle longitudinal direction.

4. The vehicle front portion structure of claim 1, further comprising:
a second lateral connecting member that is disposed between the pair of left and right front side members, and that connects the pair of left and right front side members parallel to the vehicle transverse direction, at further toward a vehicle rear side than the first lateral connecting member; and
a pair of left and right longitudinal connecting members that connect the first lateral connecting member and the second lateral connecting member,
wherein front end portions of the pair of left and right longitudinal connecting members are disposed at a vehicle transverse direction central portion of the vehicle, and
wherein the pair of left and right longitudinal connecting members both are disposed at inclines so as to go away from a transverse direction central position of the vehicle.

5. The vehicle front portion structure of claim 1, further comprising:
a pair of left and right longitudinal connecting members that connect the first lateral connecting member and the pair of left and right front side members,
wherein front end portions of the pair of left and right longitudinal connecting members are disposed at a vehicle transverse direction central portion of the vehicle, and
wherein the pair of left and right longitudinal connecting members are disposed at inclines so as to go away from a transverse direction central position of the vehicle.

6. The vehicle front portion structure of claim 1, wherein portions, which are further toward a vehicle front side than positions to which the first lateral connecting member is joined, at the pair of left and right front side members are bent at inclines with respect to the vehicle longitudinal direction so as to open toward vehicle transverse direction outer sides.

7. The vehicle front portion structure of claim 1, wherein front ends of the pair of left and right front side members are low-strength portions of which strength with respect to load in the vehicle longitudinal direction is lower than that of portions of the pair of left and right front side members other than the front ends thereof.

8. The vehicle front portion structure of claim 1, further comprising:
a second lateral connecting member that is disposed between the pair of left and right front side members, and that connects the pair of left and right front side members parallel to the vehicle transverse direction, at further toward a vehicle rear side than the first lateral connecting member; and
a pair of left and right longitudinal connecting members that connect the first lateral connecting member and the second lateral connecting member,
wherein front end portions of the pair of left and right longitudinal connecting members are disposed so as to be offset with respect to a transverse direction center of the vehicle, and
wherein the pair of left and right longitudinal connecting members both are disposed at inclines so as to approach a transverse direction central position of the vehicle while heading toward a vehicle rear side.

9. The vehicle front portion structure of claim 6, wherein the pair of left and right front side members are bent from in front of the suspension member joined portion at inclines with respect to the vehicle longitudinal direction so as to open toward vehicle transverse direction outer sides.

10. The vehicle front portion structure of claim 2, wherein both first and second lateral connecting members are attached to the opposing faces of the pair of left and right front side members.

\* \* \* \* \*